INVENTORS
ALFRED C. SCHROEDER
BY DALTON H. PRITCHARD
ATTORNEY

SOUND CANCELLATION IN TELEVISION RECEIVERS

Filed March 7, 1958 3 Sheets-Sheet 2

INVENTORS
ALFRED C. SCHROEDER
BY DALTON H. PRITCHARD
[signature]
ATTORNEY

SOUND CANCELLATION IN TELEVISION RECEIVERS

Filed March 7, 1958 3 Sheets-Sheet 3

INVENTORS
ALFRED C. SCHROEDER
DALTON H. PRITCHARD
BY [signature]
ATTORNEY 2,944,106

SOUND CANCELLATION IN TELEVISION RECEIVERS

Alfred C. Schroeder, Southampton, Pa., and Dalton H. Pritchard, Princeton, N.J., assignors to Radio Corporation of America, a corporation of Delaware Filed Mar. 7, 1958, Ser. No. 719,943

7 Claims. (Cl. 178—5.4)

This invention relates to television receivers, monitors and test equipment, for both monochrome and color television signals, and more particularly to the cancellation of the frequency modulated sound carrier appearing in the video or chrominance circuits.

In television broadcasting according to standards in the United States, the television signal following the second detector in the receiver includes a frequency modulated sound carrier at 4.5 megacycles, a modulated color subcarrier at 3.58 megacycles, and a picture brightness information signal which may extend from zero frequency to a frequency beyond the 4.5 megacycle sound carrier. Because of interaction between the various signals, it has been the practice in the design of television receivers to limit the bandwidth of the picture information signals, both luminance and chrominance, with the result that the quality of picture image reproduction has been poorer than can be obtained. For example, the brightness or luminance signal bandwidth in a monochrome receiver has been reduced considerably below 4.5 megacycles in order to avoid disturbances on the screen of the kinescope due to the sound carrier at 4.5 megacycles. Also, it has been customary to limit the frequency bandwidth of the modulated color subcarrier to avoid distortion caused by the presence of sound carrier. It is particularly important to minimize cross modulation between the sound carrier and the color subcarrier to avoid a 920 kilocycle beat. The prior art methods of minimizing the 920 kilocycle beat involves limitations of color bandwidth and introduction of color distortions.

It is a general object of this invention to provide an improved television receiver or the like capable of reproducing picture information having frequency components at and in the vicinity of the sound carrier without interference or distortion due to the presence of the sound carrier.

It is another object of this invention to provide an improved color television receiver wherein the bandwidth of the color information signal is not limited or adversely affected by the presence of the sound carrier.

In accordance with this invention, a linear second detector is employed in the receiver prior to the sound and picture channels to avoid cross modulation products which would otherwise be present and which can not be eliminated by cancellation of the sound carrier alone. The linear second detector is preferably in the form of a synchronous second detector or an envelope detector in combination with an exalted carrier arrangement. The sound carrier is cancelled, rather than trapped, out of the picture information video channel at a point following the second detector and prior to non-linear circuits in which the sound carrier, if present, could cross modulate with picture signal components. The sound cancellation signal is obtained from the sound channel at a point following a limiter in the sound channel and prior to the frequency modulation detector in the sound channel. The sound cancellation signal is therefore a constant amplitude frequency-modulated signal which is applied to the picture information channel in the proper phase and amplitude to cancel the sound carrier in the picture information channel. In addition, a cancellation control signal derived from the limiter varies in accordance with the amplitude of the sound carrier and is employed to automatically control the amplitude of the cancelling signal applied to the picture information channel. A delay means is employed in the picture information channel to equalize the envelope phase delay of the sound carrier in the two channels so that complete cancellation can be effected in the picture information channel.

These and other objects and aspects of the invention would be apparent to those skilled in the art from the following more detailed description of the invention taken in conjunction with the appended drawings, wherein.

Figure 1:
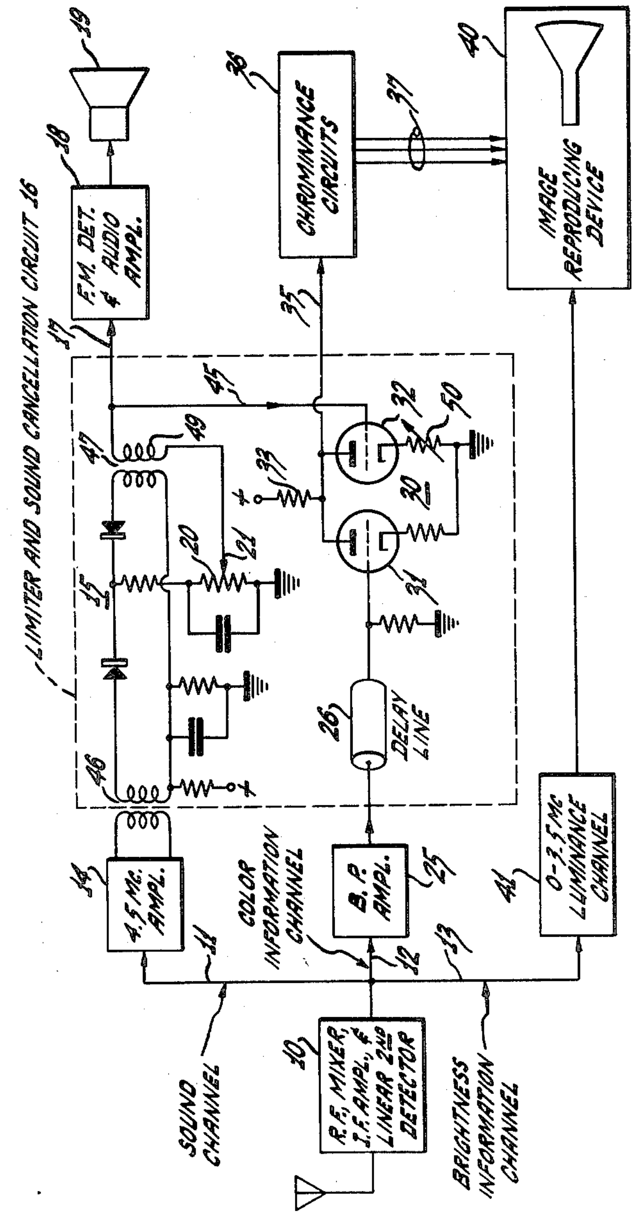
Figure 1 is a diagram of a color television receiver embodying a form of sound cancellation means according to this invention.

Referring to the color television receiver illustrated in Figure 1 of the drawings, the received television signal is applied to a radio frequency amplifier, a heterodyne mixer, an IF amplifier, and a linear second detector all located in the box 10. The output of the linear second detector is applied by a lead 11 to a sound channel, by a lead 12 to a color information channel, and by a lead 13 to a luminance channel. A frequency selective circuit or amplifier 14 selects the 4.5 megacycle frequency modulated sound carrier and applies it to the double-diode limiter 15 included in a limiter and sound cancellation circuit 16. The output of the limiter is applied over lead 17 to a frequency modulation detector and audio amplifier 18 from which the audio frequency signal is applied to a loudspeaker 19.

The limiter 15 may be any suitable type of limiter including an impedance 20 across which a direct current voltage is available which varies in accordance with the amplitude of the 4.5 megacycle sound carrier applied to the input of the limiter. A movable tap 21 on the impedance 20 is employed for deriving a sound cancellation control signal, as will be described in greater detail as the description proceeds.

The output of the linear second detector in box 10 is also applied over lead 12 through a bandpass amplifier 25, and through an envelope delay line to a cancellation circuit 30 including vacuum tubes 31 and 32 connected to a common load impedance 33. The output of the cancellation circuit 30 is applied over lead 35 to chrominance circuits 36, which may include amplifiers, color demodulators and color synchronizing circuits. The output of the chrominance circuits 36 is applied over leads 37 to an image reproducing device 40 which may be a shadow mask kinescope.

The output of the linear second detector on lead 13 is applied through luminance channel circuits 41 to the image reproducing device 40.

Figure 2:
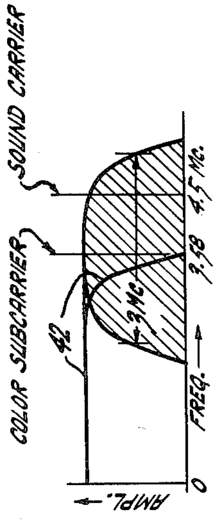
Figure 2 is a frequency spectrum diagram illustrating the television frequency components following the second detector in the receiver.

The bandpass amplifier 25 in the color information channel may have a bandwidth of 3 megacycles centered on the color subcarrier frequency of 3.58 megacycles as illustrated by the shaded portion of the frequency chart of Figure 2. It is clear that the bandpass of the amplifier 25 is wide enough to pass the sound carrier at 4.5 megacycles. However, according to this invention, the sound carrier is prevented from reaching the chrominance circuits 36 by the action of the limiter and sound cancellation circuit 16. The output of the limiter 15 includes the frequency modulated 4.5 megacycle sound carrier at a constant amplitude, that is, with all the picture information at 4.5 megacycles removed therefrom. This limited sound carrier is coupled from the output of the limiter 15 through the lead 45 to the grid of the vacuum tube 32 in such phase and amplitude as to cancel the sound carrier applied through the picture information channel to the grid of the vacuum tube 31. The coupling circuits 46 and 47 at the input and the output of the limiter are adjusted so that the sound carrier applied over lead 45 to the grid of cancellation tube 32 is exactly out-of-phase with the sound carrier applied to the grid cancellation tube 31. The variable cathode resistor 50 is adjusted to provide the proper amplitude of cancellation signal.

The sound carrier applied through the picture information channel to the tube 31 varies considerably in amplitude due to variations in the relative amplitude of the transmitted sound carrier from the same and different transmitters, and varies due to multi-path and other transmission effects. On the other hand, the sound carrier in the sound channel is limited by the limiter 15 and is applied with unvarying amplitude to the cancellation tube 32. It is therefore desirable to automatically vary the amplitude of the sound cancellation signal applied to tube 32 so that cancellation may be effected under all conditions. This is accomplished by applying the cancellation control signal derived from potentiometer 20, 21 through the secondary coil 49 and the lead 45 to the grid of the cancellation tube 32 to bias the tube 32 so that the cancellation signal developed in the common output impedance 33 is always of the correct amplitude to exactly balance or cancel the sound carrier reaching the cancellation tube 31. The gain of the cancellation tube 32 may be adjusted by means of a variable cathode resistor 50, and the potentiometer 20, 21 may be adjusted so that the cancellation control system will track the variations in amplitude needed to effect cancellation.

The delay line 26 is necessary to equalize the envelope delays of the frequency modulated sound carrier in going through the narrow-band sound channel and through the wider-band color information channel. The envelope delay of a signal varies inversely with the bandwidth of the circuit through which it is passed. In practice, the delay line 26 may provide a delay of about one microsecond. The delay line is necessary to provide cancellation of the sound carrier when it is frequency modulated by audio intelligence.

The chrominance signal available on lead 35 at the output of the cancellation circuit 30 contains no sound carrier components, but does contain the picture information signal components at, in the vicinity of, and beyond the 4.5 megacycle frequency of the sound carrier. This desirable result is achieved because the sound cancellation signal is obtained from the output of the limiter 15. All systems employing a non-limited sound cancellation signal are different from the present invention in that they necessarily also cause cancellation of picture information components at and in the vicinity of 4.5 megacycles.

It is generally not necessary to cancel the sound carrier in the luminance channel 41 of a color television receiver because the luminance signal is ordinarily restricted to frequencies below the 3.58 megacycle frequency of the color subcarrier, as represented by the response 42 in Figure 2, to avoid disturbances in the reproduced image that would be caused by the color subcarrier. However, if desired, the restricted bandpass amplifier 25 may be removed from the position shown, and the output of the cancellation circuit lead 35 may be applied to both the chrominance circuits 36, and the luminance channel 41.

Figure 3:
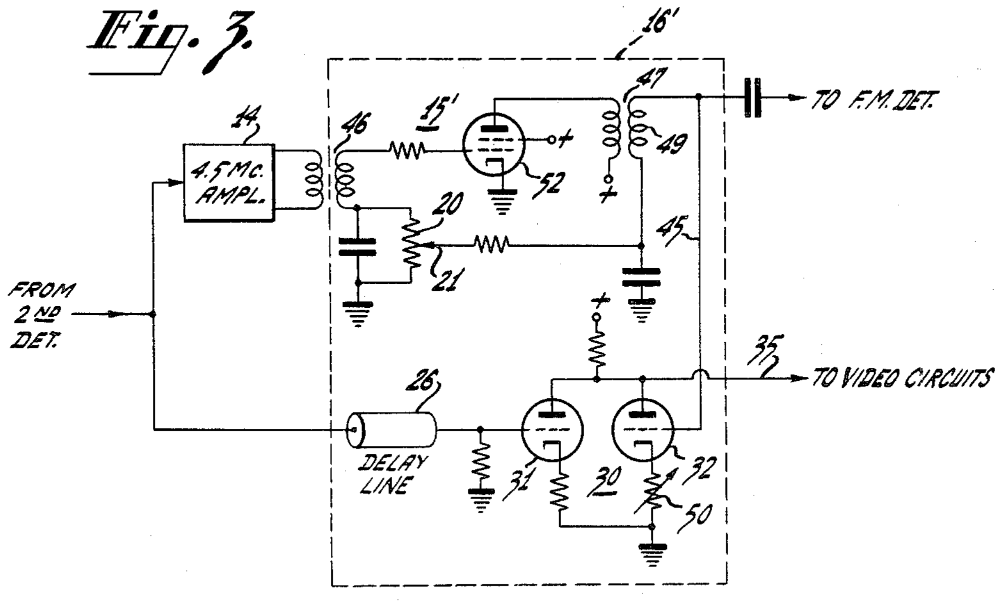
Figure 3 is a circuit diagram of a limiter and a sound cancellation circuit which may be employed in the system of Figure 1, or in the system of Figure 4.

Figure 3 illustrates another limiter and sound cancellation circuit 16′ which differs from the circuit 16 in Figure 1 merely in the details of the limiter 15′. A multigrid tube 52 is employed in place of the two diodes in Figure 1. The circuit of Figure 3 is otherwise similar to the circuit 16 in Figure 1 and the same reference numerals are applied to corresponding elements.

Figures 4, 5:
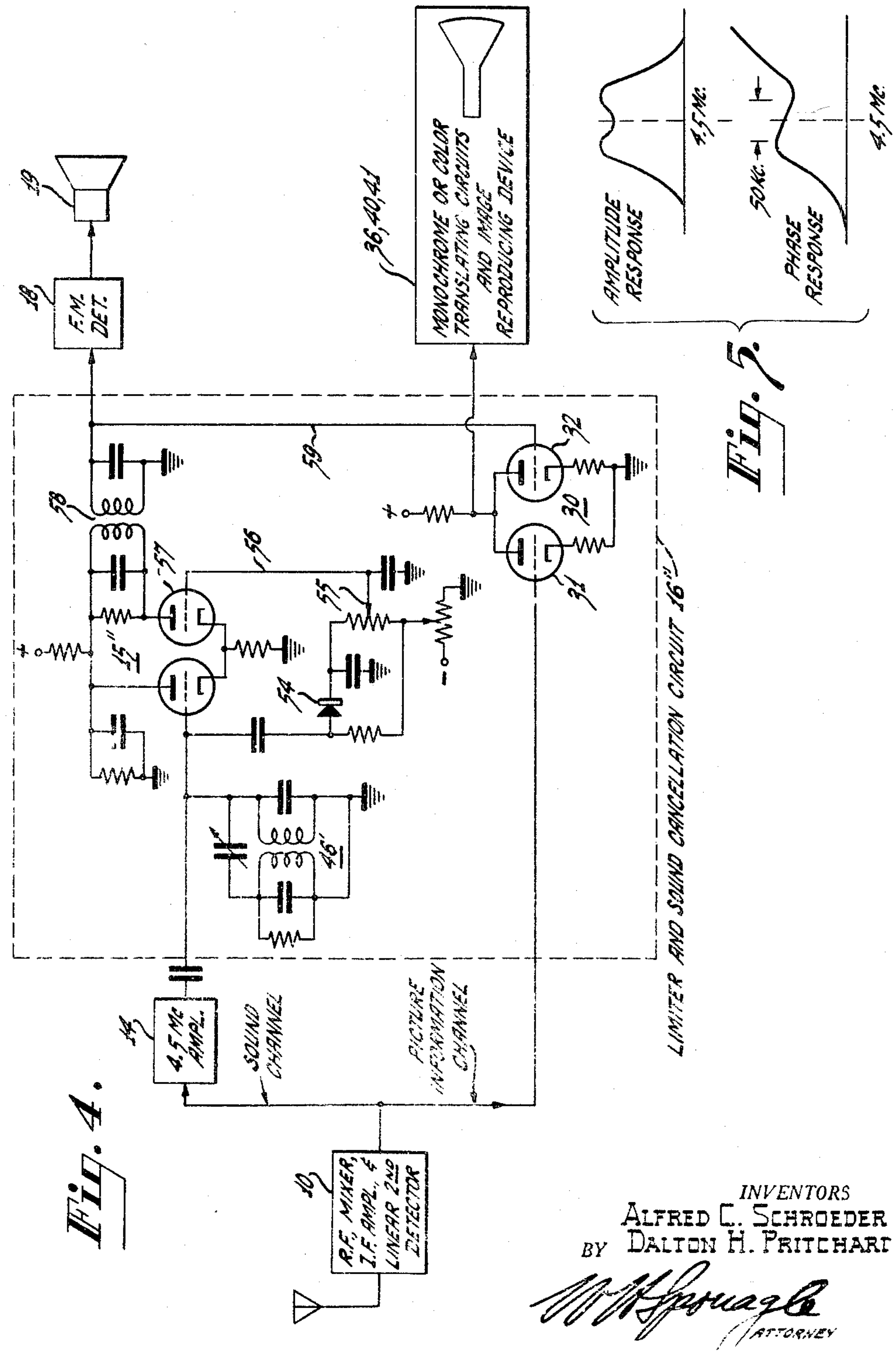
Figure 4 is a diagram of a monochrome television receiver including a third limiter and sound cancellation circuit which may be employed in the system of Figure 1.
Figure 5 is a chart illustrating the amplitude and phase characteristics of the limiter input circuit in Figure 4.

Figure 4 includes a third form limiter and sound cancellation circuit designated 16″, which is a cathode coupled limiter. In the circuit 16″, the delay line 26 in Figures 1 and 3 is eliminated, and its function of envelope delay equalization is accomplished by means of the tuned input circuit 46′ of the limiter 15″. The input circuit 46′ has an amplitude response and a phase response as illustrated in Figure 5 of the drawings. It will be seen in Figure 5 that the phase response of the circuit 46′ has a region of negative slope extending over the frequency deviation range of at least 50 kilocycles centered on the sound carrier frequency of 4.5 megacycles. By this construction, the envelope delay of the sound carrier going through the sound channel is reduced to such an extent, that the envelope delay of the sound carrier going through it equals the envelope delay of the sound carrier going through the wider bandwidth picture information channel. It is therefore unnecessary to include a delay line in the picture information channel.

In the limiter and the sound carrier cancellation circuit 16″, a separate diode 54 is employed for generating the automatic cancellation control signal at sliding contact 55. This automatic cancellation control signal is applied over lead 56 to the control grid of limiter tube 57 to control the amplitude of the sound carrier cancellation signal coupled through transformer 58 and lead 59 to the cancellation tube 32.

Figure 6:
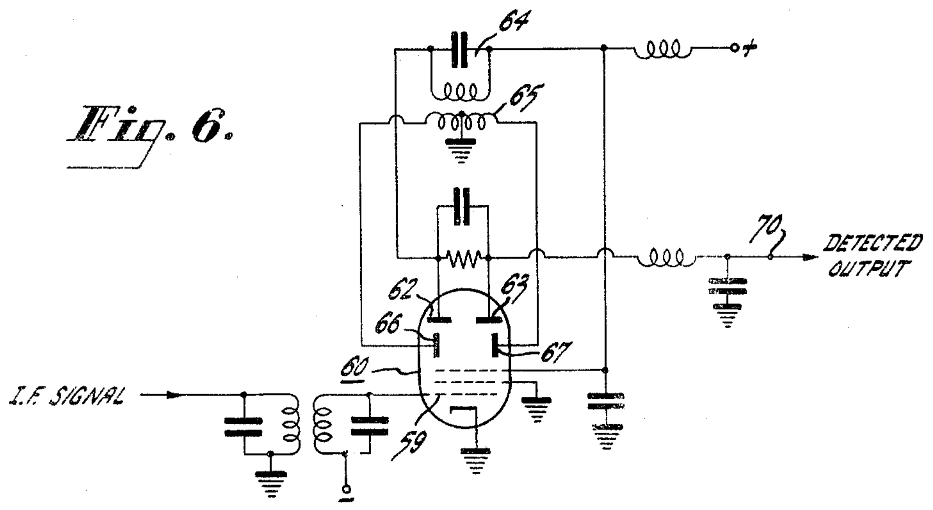
Figure 6 is a circuit diagram of a linear second detector which may be employed in the systems of Figures 1 and 4.

The linear second detector in box 10 of Figures 1 and 4 may be a synchronous detector as illustrated in Figure 6. The intermediate-frequency vestigial-sideband television signal is coupled to the control grid 59 of a split-anode deflection tube 60. The carrier frequency component of the IF signal is amplified in the tube and signals from both anodes 62 and 63 appear across the sharply tuned circuit 64. This carrier signal is coupled in opposite polarities by means of secondary coil 65 to the deflection electrodes 66 and 67. A synchronously detected signal appears on the anode 63 and is coupled through a low pass filter to the output terminal 70. The detected output is free of the products of cross modulation between the sound, luminance, chrominance, noise and adjacent channel signals, such as would result in a conventional non-linear detector. For example, there is no 920 kilocycle beat between the 3.58 megacycle color subcarrier and the 4.5 megacycle sound carrier, and there are no beats between the sound carrier and various picture information components.

It is thus apparent that according to this invention means are provided for cancelling the sound carrier in the picture information channel of a television receiver or the like in such a manner that the picture information channel bandwidth need not be limited and is not adversely affected by the sound carrier.

What is claimed is:

1. In a television receiver or the like, the combination of, a linear second detector providing a picture information video signal and a frequency modulated sound carrier within the frequency range of said video signal, a sound channel coupled to said detector and including frequency selective means and a limiter, said limiter responding to the signal output provided by said detector to develop a frequency modulated sound carrier output substantially free of amplitude modulation, a video channel also coupled to said detector, and means coupled between said limiter and said video channel for applying the substantially amplitude modulation free frequency modulated sound carrier output of said limiter to said video channel in such phase and amplitude as to cancel said sound carrier therein.

2. In a television receiver or the like, the combination of, a linear second detector providing a picture information video signal and a frequency modulated sound carrier within the frequency range of said video signal, a sound channel coupled to said detector and including frequency selective means and a limiter having an output terminal, said limiter responding to the signal output provided by said detector to develop at said output terminal a frequency modulated sound carrier output substantially free of amplitude modulation, a video channel also coupled to said detector and including an envelope delay means, and means coupled between said output terminal and a point in said video channel subsequent to said envelope delay means for applying the substantially amplitude modulation free frequency modulated sound carrier output of said limiter to said video channel in such phase and amplitude as to cancel said sound carrier therein.

3. In a television receiver or the like, the combination of, a linear second detector providing a picture information video signal and a frequency modulated sound carrier within the frequency range of said video signal, a sound channel coupled to the output of said detector, said sound channel including limiter means responding to the signals provided by said detector for developing at a limiter means output terminal a frequency modulated sound carrier output substantially free of amplitude modulation, a video channel also coupled to the output of said detector, means coupled to said limiting means output terminal for applying a sound cancelling signal comprising said sound carrier means output terminal to said video channel in such phase and amplitude as to cancel said sound carrier therein, and means for automatically controlling the amplitude of the sound cancelling signal applied to said video channel in accordance with variations in the level of the sound carrier provided by said detector.

4. In a television receiver or the like, the combination of, a linear second detector providing a picture information video signal and a frequency modulated sound carrier within the frequency range of said video signal, a sound channel coupled to said detector and including frequency selective means and a limiter circuit, said limiter circuit providing a frequency modulated sound carrier output substantially free of amplitude modulation, said limiter circuit including a source of a sound cancellation control signal varying in accordance with variations in the level of the sound carrier provided by said detector, a video channel also coupled to said detector and including an envelope delay means and a cancellation circuit, means for applying a sound cancelling signal the substantially amplitude modulation free sound carrier output of said limiter circuit to said cancellation circuit in such phase and amplitude as to cancel said sound carrier therein, and means coupling said cancellation control signal to said cancellation circuit to automatically vary the level of said sound cancelling signal, whereby the video output of said cancellation circuit includes video modulation at the frequency of said sound carrier but is free of sound carrier components.

5. In a television receiver or the like, the combination of, a linear second detector providing a picture information video signal and a frequency modulated sound carrier within the frequency range of said video signal, a sound channel including a limiter having an input circuit coupled to said detector, said limiter input circuit having a negative slope phase characteristic for the range of frequencies occupied by said frequency modulated sound carrier, said limiter having an output circuit in which is developed a frequency modulated sound carrier output substantially free of amplitude modulation, said limiter also including a source of a sound cancellation control signal varying in accordance with the level of the sound carrier provided by said detector, a video channel also coupled to said detector and including a cancellation circuit, means for applying a sound cancelling signal comprising said substantially amplitude modulation from sound carrier output from said limiter output circuit to said cancellation circuit in such phase and amplitude as to cancel said sound carrier therein, and means for utilizing said cancellation control signal to automatically vary the level of said sound cancelling signal applied to said cancellation circuit.

6. In a color television receiver or the like, the combination of, a linear second detector providing a modulated color subcarrier signal and a frequency modulated sound carrier, a sound channel coupled to said detector and including a limiter circuit providing a frequency modulated sound carrier output substantially free of amplitude modulation, a chrominance channel also coupled to said detector, means coupled to said limiter circuit for applying a sound cancelling signal comprising the substantially amplitude modulation free sound carrier output of said limiter circuit to said chrominance channel in such phase and amplitude as to cancel said sound carrier therein, and means to automatically vary the level of said sound cancelling signal in accordance with the level of said sound carrier provided by said detector.

7. In a color television receiver, the combination of, a linear second detector providing a picture information video signal including a modulated color subcarrier signal and a frequency modulated sound carrier, a sound channel coupled to said detector and including a limiter circuit providing a frequency modulated sound carrier output of substantially constant amplitude, said limiter circuit including a source of a sound cancellation control signal varying in accordance with the level of the sound carrier provided by said detector, a chrominance channel also coupled to said detector and including an envelope delay means and a cancellation circuit, said envelope delay means being interposed in said chrominance channel intermediate said detector and said cancellation circuit, means coupled to said limiter circuit for applying a sound cancelling signal comprising said substantially constant amplitude sound carrier output to said cancellation circuit in such phase and amplitude as to cancel said sound carrier therein, and means for utilizing said cancellation control signal to automatically vary the level of said sound cancelling signal applied to said cancellation circuit.

References Cited in the file of this patent

UNITED STATES PATENTS 2,819,334 Squires ---------------- Jan. 7, 1958